United States Patent [19]

Cobbs, Jr. et al.

[11] 4,423,161
[45] Dec. 27, 1983

[54] APPARATUS AND METHOD FOR DISPENSING FOAMABLE COMPOSITIONS

[75] Inventors: Walter H. Cobbs, Jr., Amherst; William R. Rehman, Vermilion, both of Ohio

[73] Assignee: Nordson Corporation, Amherst, Ohio

[21] Appl. No.: 262,468

[22] Filed: May 11, 1981

Related U.S. Application Data

[62] Division of Ser. No. 16,207, Feb. 28, 1979, Pat. No. 4,301,119.

[51] Int. Cl.³ .............................................. C08J 9/30
[52] U.S. Cl. ........................................ 521/73; 264/50; 264/53; 264/DIG. 5; 521/78; 521/79; 521/80; 521/917; 156/244.11; 156/500; 427/244
[58] Field of Search ............... 521/78, 79; 264/45.9, 264/50, 53; 422/133

[56] References Cited

U.S. PATENT DOCUMENTS

| | | | |
|---|---|---|---|
| 2,450,436 | 9/1948 | McIntire | 521/79 |
| 2,663,670 | 5/1972 | Swayne et al. | 521/79 |
| 2,666,036 | 1/1954 | Schwencke | 521/79 |
| 2,730,433 | 1/1956 | Cartledge | 521/78 |
| 2,779,689 | 1/1957 | Reis, Jr. | 264/54 |
| 2,881,141 | 4/1959 | Smythe | 521/78 |
| 2,885,738 | 5/1959 | Henning | 521/79 |
| 3,020,248 | 2/1962 | Henning | 521/79 |
| 3,102,865 | 9/1963 | Sneary et al. | 521/79 |
| 3,156,535 | 11/1964 | Humphreys | 422/133 |
| 3,812,062 | 5/1974 | Tatzel et al. | 54/79 |
| 3,912,666 | 10/1975 | Spitzer et al. | 521/78 |
| 4,120,923 | 10/1978 | Kloker et al. | 422/133 |
| 4,140,661 | 2/1979 | Connett | 521/78 |
| 4,260,351 | 4/1981 | Takano et al. | 264/45.9 |
| 4,302,409 | 11/1981 | Miller et al. | 264/45.9 |

*Primary Examiner*—Morton Foelak
*Attorney, Agent, or Firm*—Wood, Herron & Evans

[57] ABSTRACT

Pressure vessels are disclosed for containing a foamable mixture of liquid and a blowing agent for incrementally or continuously dispensing a foam of constant foam-volume ratio. Liquid compositions having coating or polymeric solids are capable of being foamed and dispensed with the apparatus. The method and apparatus are especially advantageous in dispensing foamed coatings, paints or adhesives with superior control.

9 Claims, 3 Drawing Figures

APPARATUS AND METHOD FOR DISPENSING FOAMABLE COMPOSITIONS

This is a division of application Ser. No. 16,207, filed Feb. 28, 1979, now U.S. Pat. No. 4,301,119.

RELATED APPLICATIONS

This application is related to application Ser. No. 791,338, filed Apr. 27, 1977, now U.S. Pat. No. 4,156,754, in the names of Walter H. Cobbs, Jr. and Robert G. Shong and application Ser. No. 842,265, filed Oct. 14, 1977 now U.S. Pat. No. 4,247,581 in the names of Walter H. Cobbs, Jr., Robert G. Shong and William R. Rehman.

BACKGROUND OF THE INVENTION

As disclosed in the above identified applications, various methods and apparatus may be employed for foam coating or adhesive bonding. Ordinarily, the foamable liquid compositions and blowing agents are contained in a pressure vessel. For instance, a paint composition is mixed with a fixed quantity of liquid blowing agent such as freon, butane, propane and the like, in a vessel of constant volume, strong enough to withstand the pressure of the blowing agents at the temperature of choice. However, as the foamed paint is dispensed from the vessel, usually by means of a dip tube inserted into the vessel and a release valve, each increment of foam is issued at a decreasing foam-volume ratio in respect to the one preceeding it. The term "foam-volume ratio" is used in this context to mean the ratio of foam-volume to the volume of liquid before foaming. Reduction in foam-volume ratios upon dispensing foamable compositions from pressure containers causes a lack of process control in dispensing foamable compositions. As a result, coatings or adhesives of uniform or satisfactory quality are not achievable with present pressure containers. Furthermore, this foam dispensing problem makes it impractical to withdraw as much as even one-third to one-half the liquid volume from the vessel for foaming.

SUMMARY OF THE INVENTION

A method and apparatus are provided for dispensing a foam of substantially constant foam-volume ratio. According to this invention, a vessel is provided for containing a foamable mixture of liquid and a blowing agent under pressure. The vessel has a vapor space above the liquid and a dispensing outlet. Additionally provided is a means for maintaining a substantially constant composition of blowing agent in the vapor state, under a vapor pressure at least equal to the vapor pressure of the foamable mixture, for dispensing a foam of constant foam-volume ratio. It has been found that foaming agent is lost from the vapor space above the liquid mixture being dispensed as a portion of the liquid mixture is removed for foaming. Therefore, successive increments of foam issue at decreasing foam-volume ratios. Such a loss of foaming agent and the attendent process difficulties associated therewith are overcome by the process and apparatus of this invention.

In a preferred form, in addition to a main vessel or pot for containing a foamable composition, a second pressure container is provided. The second pressure container holds a chosen blowing agent composition in the vapor space of the second container which is connected to the vapor space of the main vessel. For instance, the second pressure container is connected to the main pressure pot by means of a pipe, pressure hose or line running between the vapor spaces of the two vessels. When the foaming agent above the liquid in the main pressure pot is lost, the foaming agent from the additional pressure container is supplied to the main pressure pot. Therefore, this apparatus provides a substantially constant composition of blowing agent in the vapor state of the pressure pot and the vapor pressure is also maintained equal to or slightly greater than the vapor pressure of the mixture of foamable liquid and blowing agents in the pressure pot.

In another preferred form, in the line between the vapor spaces of twp pressure vessels, a control valves operates to maintain the vapor pressure at least equal to or greater than the vapor pressure of the foamable liquid mixture in the main pressure vessel. The apparatus is especially suitable for use with coating or other polymeric compositions, whether they are normally liquids or are melted or heated to a liquid state. The apparatus has heating means associated therewith in order to melt or heat the compositions for foaming or in order to activate the blowing agents. Furthermore, associated with the apparatus in the preferred forms are means for controlled conveyance of the foam composition toward substrates for coating. In one form, the controlled conveyance means would include a dispensing nozzle for adhesive bonding. In another form, atomization and spraying means are employed. Thus, foams of substantially constant foam-volume ratios may be conveyed through either a hot melt gun or a fluid atomizing nozzle by employing the principles of this invention. Production of substantially constant foam-volume ratios enables greater process control and more advantageous foam formation for painting or coating.

DETAILED DESCRIPTION

The method and apparatus of this invention permits foaming and dispensing many liquid compositions having constant foam-volume ratios. Liquid compositions which may be foamed according to this invention include coating and adhesive compositions which comprise liquid film-forming or polymeric components. Thus, the polymeric component may range from a liquid, to a semi-solid paste, to solid under normal conditions. The foams, while in a liquid state, may contain either solid or liquid film-forming components. The liquid state of the foam, or film-forming solids, may be enhanced by the application of temperature and, as such, hot melt foam compositions may be used according to the process of this invention. In the hot melt form or ambient liquid form, the foam may contain either thermoplastic or thermosetting resinous compositions. Polymeric compositions can be obtained in liquid form, without the addition of solvents or other liquid diluents as by melting, for example. Common resins of the industrial coatings industry, with or without solvents, are therefore suitable including syrups of methacrylates, acrylates and copolymers thereof, alkyd resins, polyester resins, polyurethanes, epoxies, coating grade polyethylenes, ethylene vinylacetate copolymers, polyvinylchlorides, various rubber compositions and the like. The coating and finishing resins presently primarily in use are alkyd polyester resins or polyesters. In this regard, the term "alkyd" polyester resin is intended to include those resins which are modified polyester resins, usually oil modified resins. "Polyester resins" are the synthetic resins derived from polyfunctional alcohols or acids. The next most important resin for present industrial coating is made up of mainly acrylic polymers and copolymers, with the balance of the market comprising vinyls, epoxies, polyurethanes, aminos, cellulosics and other similar resins. Therefore, it is to be understood that the film-forming component of the liquid compositions of this invention includes a wide variety of polymeric components of the type just mentioned and well understood by those skilled in the arts of the paint and coatings industry. The principal polymeric composition which may be employed in any of the methods defined above depends upon the end use of the composition, whether for coating, adhesive, structural purposes, and so forth, as will be understood to a person of ordinary skill in the art. Sources existing in the surface coatings literature to illustrate the specific types of coatings for particular domestic or industrial applications include the handbood of "Surface Coatings" prepared by the Oil and Color Chemists' Association, Australia, in conjunction with the Australian Paint Manufacturers' Federation, the New South Wales University Press, 1974; Treatise on Coatings, Col. 4 (in two parts entitled "Formulations", Part I, edited by R. R. Myers and J. S. Long, Marcel Dekker, Inc., 1975); and "Paint Finishing in Industry" by A. B. Harvey, Second Edition, Robert Draper, Great Britain (1967). These sources are included herein by reference for more detailed disclosures of compositions and coating techniques which may be used according to the principles of this invention.

Another class of liquid compositions which may be foamed employing the method and apparatus of this invention includes plastisols or organosols. A plastisol is a suspension or dispersion of small particles of a polymeric substance in a liquid plasticizer for the polymeric substance. A plastisol contains no volatile thinners or diluents. Plastisols often contain stabilizers, fillers and pigments, but all ingredients have low volatility during processing and end use. Closely associated with plastisols are organosols. Organosols are dispersions extended with organic volatiles which are removed during fusion of the polymeric material. The most commonly useful polymeric substance for plastisols is polyvinyl chloride and its copolymers such as vinylacetate, acrylate and maleate. Further examples of foamable plastisol systems include polyvinyl butyral, cellulose acetate butyrate, polyvinylidene fluoride, polymethyl methacrylate and others from the list of polymers described above. A reference on plastisol and organosol compositions in general, for inclusion herein, is "Plastisols and Organosols", edited by Herald A. Sarvetnick, Van Nostrand Reinhold Company, 1972 Library of Congress Catalog No. 75-151258, Chapter 6, pages 83–105.

Other liquid compositions which may be processed according to this invention are thermoplastic materials employed for coating, adhesive, or structural purposes. A "thermoplastic material", as that term is used and understood to those skilled in the art, includes any natural or synthetic thermoplastic polymer or polymeric composition. A thermoplastic material is a normally solid or sem-solid material at use temperatures and it melts or liquifies upon heating to a higher temperature. Upon cooling the material solidifies or returns to a solid or semi-solid state. As also used in this description, the term "thermoplastic hot melt adhesive" or "hot melt adhesive" is a term which is well known in the art and this material has the same characteristics of liquification upon heating and, upon cooling, solidification to a solid, semi-solid or tacky state. Examples of thermoplastic materials include polymers of ethylenically unsaturated monomers, such as polyethylene, polypropylene, polybutylenes, polystyrenes, poly (α-methyl styrene), polyvinyl chloride, polyvinyl acetate, polymethyl methacrylate, polyethyle acrylate, polyacrylonitrile and the like; copolymers of ethylenically unsaturated monomers such as copolymers of ethylene and propylene, ethylene and styrene, and polyvinyl acetate; styrene and maleic anhydride; styrene and methyl methacrylate; styrene and ethyl acrylate; styrene and acrylonitrile; methyl methacrylate and ethyle acrylate and the like; polymers and copolymers of conjugated dienes such as polybutadiene, polyisoprene, polychloroprene, styrenebutadiene rubber, ethylene-propylene-diene rubber, acrylonitrile-styrene butatiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. The term "thermoplastic material" is sometimes used herein interchangeably with "hot melt", "melt", "hot melt thermoplastic" or "hot melt adhesive". It is, of course, to be appreciated that all these compositions are characterized by their thermoplastic nature as above defined. A number of thermoplastic or hot melt adhesive compositions may be employed. These and other materials are sometimes identified by trademarks. However, certain of such trademarked materials are defined in *The Condensed Chemical Dictionary*, 8th Edition, Revised by G. G. Hawley, Van Nostrand Reinhold Company, Library of Congress Cat. Card No. 75-133848 (1971). Thus, these definitions are incorporated herein by reference. For example "ELVAX" is a copolymer of ethylene vinylacetate (EVA) by DuPont. A conventional polyethylene based adhesive composition is "Eastabond A-3", manufactured by Eastman Chemical Company. In addition, "AC 635" is another polyethylene based composition by Allied Chemical. "Terrell 6100" is a polyester composition and "A-FAX 500" is a polypropylene polymer by Hercules. Polyamides are sold under the trademark "Versalon 1338" by General Mills.

In addition to the variability in polymer formulations, different types of gases or liquid blowing agents may be employed in this method and apparatus including air, nitrogen, oxygen, carbon dioxide, methane, ethane, butane, propane, helium, argon, neon, fluorocarbons such as dichlorofluoroethane, monochlorotrifluoromethane, or other gases or liquids, or mixtures of any of these. Such blowing agents can be varied again according to the types of liquid compositions which are foamed, including a thermoplastic material, plastisol or organosol, conditions and availability of materials. Liquid blowing agents are preferred because lower maintenance pressure in the apparatus may be employed. Preferably, the composition of the blowing agent in the liquid mixture of the main pressure pot is maintained in the vapor space by supplying the same agents of the above type from a second vessel or source. Thus, the blowing agent composition in the vapor stage above the liquid mixture is substantially constant. Diluents may be added to the vapor, however, if need be, depending upon the liquid composition being foamed. Therefore, "substantially constant composition of blowing agent" is intended to mean herein that fluctuations in blowing agent amounts or kinds, or diluents thereof, may occur and still achieve dispensing of substantially constant foam-volume ratios. Other dispersing apparatus may be included, including tubes having sintered or porous metal tips, perforated baffle plates and motor driven rotary dispersers, to mention a few.

In practicing the process of this invention, therefore, with any of the above liquid foamable compositions, the liquid composition and blowing agent are selected such that after pressurization and, with or without the action of heat, depending upon the nature of the components or conditions, the blowing agent vaporizes to form the foam. Again, the ratio of volume occupied after foaming to volume occupied before foaming of the liquid is term "foam-volume ratio". This ratio is usually controlled ranging up to about 50:1. Depending upon the use of the foamed material, i.e., either as a paint, adhesive, etc., the foam material may be end-processed in a number of different manners. For instance, in the coating area, depending upon the method of coating conveyance, the composition will undergo different mechanisms of disintegration in film-forming upon a substrate. Where atomization and spraying are the modes of conveyance, from disintegration will be initiated and occur prior to film-forming solids being deposited upon the substrate. In this instance, the ease of atomization of very high polymeric liquid is accomplished by reason of the energy that is stored in the liquid surface of the foam bubbles. In another form, however, foams of high polymeric solids may first be deposited upon a substrate by a suitable technique and disintegration thereon to form a continuous film coating from the film-forming solids. Further details of such methods may be had by reference to Cobbs et al application Ser. No. 842,265, filed Oct. 14, 1977 and entitled "Foam Coating" which is incorpoerated herein by reference.

In the preferred form of the apparatus of this invention where one pressure pot is employed for the liquid foamable composition and a second container is employed to supply a blowing agent, vapor is controlled between the vessels. For instance, when foamed compositions are not being dispensed from the pressure pot, a valve which connects the two vapor spaces between the vessels should be cut off to prevent too much blowing agent from being introduced into the pressure pot. Otherwise, the excess blowing agent and vapor pressure increase may change the subsequent foam-volume ratios. Therefore, a valve between the vapor spaces of the vessel is provided to control the passage between the vapor spaces. Further, when the main dispensing valve is shut, the control valve may be cut off so that such ratios may be maintained. Otherwise, the pressure and temperature would tend to increase in the main pressure pot, as well, because the second pressure container is usually controlled at a higher pressure or temperature than the main pressure pot in the functioning of this preferred apparatus. Stabilization of the foams produced according to the method and apparatus may be effected by employing certain factors as developed in copending application Ser. No. 719,813, now U.S. Pat. No. 4,129,509 of Cobbs et al. In general, the amount of the liquid blowing agent mixture is chosen from about 0.05% to about 5%, preferably about 1 to about 3% by weight of the liquid composition or polymeric material contained therein. It will be understood that the range of the liquid blowing agent suitable for use in a particular composition will be governed by the need to achieve satisfactory foaming results as will be understood by one of ordinary skill in the art in view of this description. Reference again may be had to FIG. 3 of Cobbs et al Ser. No. 719,813 for the generalized situation. In summary, the mixture of the liquid composition or resin with liquid blowing agents is usually heated to a temperature substantially above the boiling point of the liquid and simultaneously pressurized to a pressure at least high enough that it exceeds the vapor pressure of the liquid blowing agent mixture at that temperature. This pressurized mixture is allowed to foam by release of pressure to atmospheric pressure or below with the temperature maintained above the boiling point of the liquid. This foam may then of course be used by application to a substrate, or between substrates for bonding, by dipping, spray atomization, roll coating, or extrusion such as in structural foam formation, etc. After foaming and during conveyance or thereafter, the foam is allowed to fall in temperature below the boiling point of the blowing agent mixture at atmospheric pressure whereupon the bubbles of the foam may disappear either by evaporation and/or condensation of the liquid blowing agent, depending upon the processing to form foam bodies or substantially continuous films.

The principles of this invention will be further understood with reference to the following detailed examples and drawing in which.

I. Polyester Paint and Methanol, Propane and Butane Blowing Agents

Figure 1:
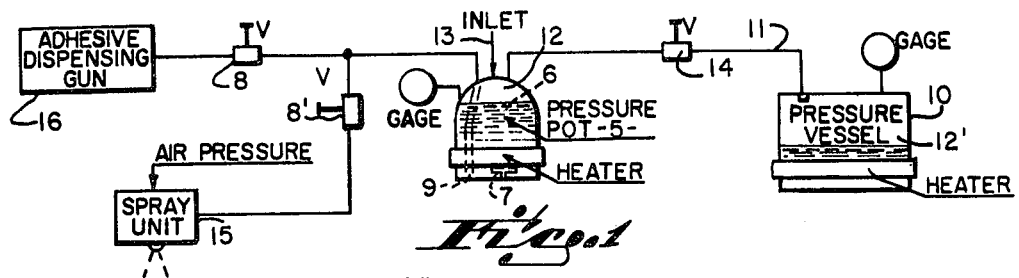
FIG. 1 is a schematic of a suitable apparatus for making a foam material and dispensing it according to this invention.

Referring to FIG. 1 of the drawing, an apparatus for performing the method is shown. The apparatus employs a pressure pot 5 for heating and pressurizing a liquid 6 which may be spray-coated as paint or dispensed as adhesive. The pressure vessel or pot 5 was equipped with a stirrer 7 and a dispensing valve 8 or 8' from which the foam may be drawn from the pressure pot 5 by means of a dip tube 9 beneath the liquid level for paint spray or adhesive dispensing. An additional pressure vessel 10 is connected to the pressure pot 5 by means of a pipe 11 between the vapor spaces 12, 12' of the two vessels. In the second pressure vessel 10, the foaming agent mixture is also contained for controlling withdrawal of uniform foam-volume ratios. A heater was also associated with the second pressure vessel. A polyester paint composition was formulated and charged into the pressure pot through the inlet 13. The ingredients of the composition were:

(1) Polyester Resin—415.5 parts
(2) $TiO_2$—475.0 parts
(3) Hexamethoxymethyl melamine—178.1 parts
(4) Silicone surfactant—1.8 parts
(5) Catalyst—3.0 parts
(6) Methanol With further reference to FIG. 1, 4457 grams of the paint composition above detailed were introduced into the pressure pot 5 and maintained under a temperature less than about 200° F., e.g., at about 185° F. The pressure pot heaters were operated to allow the high viscosity paint composition to be maintained at this temperature for foaming. First 120 grams of a 50/50 mix of propane and butane was weighed into the pot 5 and mixed under pressure with the paint. The pressure and foam ratio were measured. In like manner, incremental amounts of the 50/50 mix of propane and butane were added to the pressure pot and the pressure and foam ratio measured after thorough stirring. Table I summarizes the data. Temperature is expressed in °F., and pressure in psig. The ratio reported is based on one unit, i.e., "3.5" means 3.5 foam to liquid volume.

TABLE I

| Added Grams 50/50 Propane/Butane | Temperature | Pressure | Foam-Volume Ratio |
|---|---|---|---|
| 120 | 185 | 214 | 3.5 |
| 15 | 185 | 233 | 4.5 |
| 15 | 185 | 238 | 6.3 |
| 10 | 185 | 241 | 7.6 |
| 10 | 185 | 242 | 8.0 |
| 15 | 185 | 244 | 9.7 |
| 10 | 185 | 246 | 9.7 |
| 15 | 183 | 230 | 11.4 |
| 10 | 182 | 237 | 12.0 |
| 10 | 188 | 263 | 11.6 |

Thus, 230 grams of the foaming agent mix had been added to attain about 12:1 foam ratio at a pressure 263 psig and 188° F. Into the pressure vessel 10, 329 grams of methanol, 400 grams of butane and 407 grams of propane were successively weighed by difference. The vessel 10 was placed in a thermostated oil bath and heated to 185° F. The pressure read 275 psig. After purging the line 11 of air between the pot 5 and the vessel 10 (vessels) using vapor from the vessel, the valve 14 between the two vessels was opened. After opening of the valve, the pressure on both vessels read 275 psig at 185° F. Six cup tests in succession were made from the pot for foam-volume ratio, withdrawing successive portions at ambient room conditions each time of approximately 20 grams. The data are summarized in Table II.

TABLE II

| No. of Cup | Weight Net | Volume Ratio |
|---|---|---|
| 1 | 20.5 | 11.3 |
| 2 | 21.5 | 10.7 |
| 3 | 19.5 | 11.9 |
| 4 | 17.0 | 13.7 |
| 5 | 20.0 | 11.7 |
| 6 | 18.0 | 13.0 |

At the sixth cup 2915 grams of paint remained in the pot 5.

The foam ratio was thus maintained at approximately 12:1 and does not decrease with successive withdrawals. A constant composition foam is thus produced and may be sprayed using an air spray 15 or an adhesive dispensing gun 16.

II. Polyester Paint and Propane, Butane and Mixed Blowing Agents

Other foaming agents were employed for foaming the polyester paint from the pressure pot. The paint was mixed with a fixed quantity of the liquid blowing agent, i.e., either butane, propane, or mixtures of the two. In order to dispense increments of foam at essentially the same foam-volume ratio on successive withdrawals, in the apparatus shown, the chosen composition of foaming agents, i.e., either butane, propane, or a mixture thereof, was introduced into the pressure vessel so that the total vapor pressure in the space above the liquid contained in the pot was equal to or slightly greater than the vapor pressure of the mixture of paint and foaming agents in the pressure pot. Of course the apparatus of FIG. 1 is employed under these circumstances in order to get a continuous foam-volume ratio upon subsequent withdrawals from the static or single-fill pressure pot shown. While the apparatus shown in FIG. 1 is a single fill pressure pot (a static system), a continuous refill and withdrawal system may also be employed.

Figure 2:
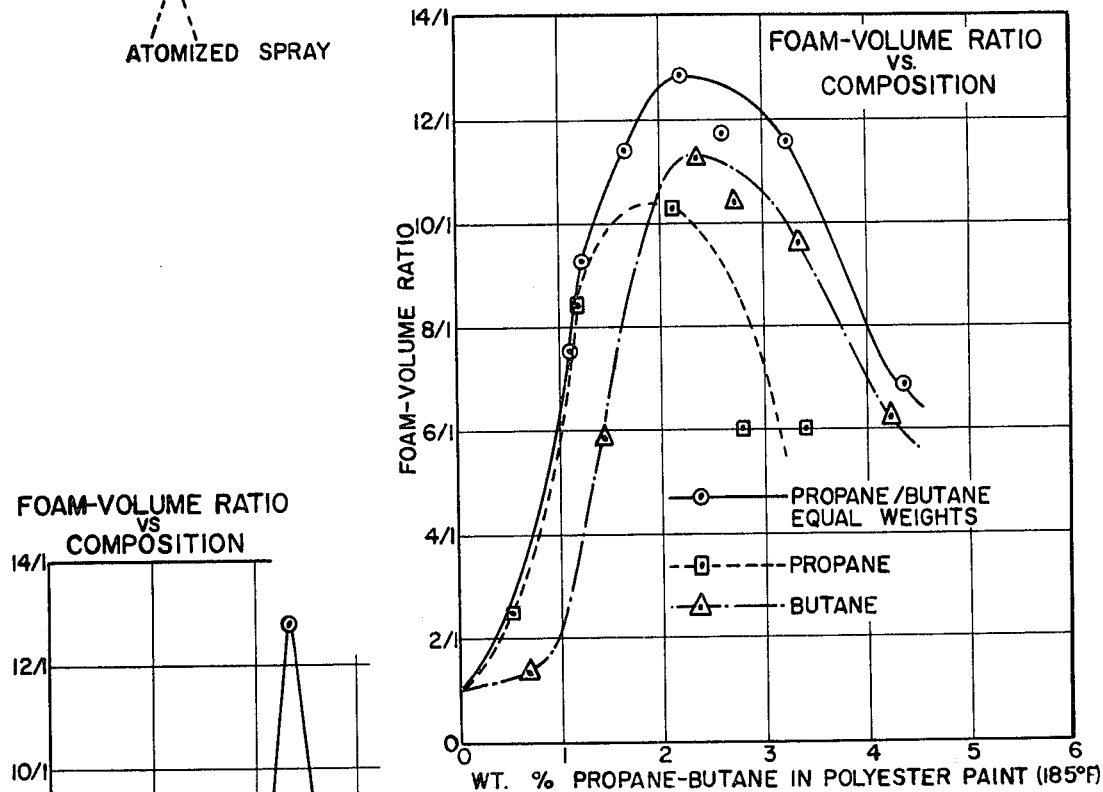
FIG. 2 is a series of vapor pressure curves illustrating the choice of ratio of the foaming agent mixture of propane and butane for polyester paint.

Referring to FIG. 2, where the paint/foaming agent mixture in the pressure pot of FIG. 1 has equal ratios of butane and propane in it and at 2.1% total weight, foaming agents give a vapor pressure of 180 psia. Then the same 50/50 mixture of butane and propane should be used in the second pressure vessel in the range of 180 to 200 psia vapor pressure to achieve uniform ratio output. At a foam ratio by volume of 12.9:1, a vapor pressure of 194.7 was achieved with a 50/50 mixture of propane and butane at 2.3% total weight. The amounts and vapor pressures of the blowing agents introduced into either the pressure pot or the vessel are found by applying the Henry and Raoult Laws under the assumption that these laws are obeyed by any combination of propane and butane.

When the polyester paint composition is spray-coated onto a substrate, the foam is passed under pressure to the entrance port of a spray unit, for instance a Model 61 Binks air spray unit. For instance with a fluid atomizing nozzle of 0.052 inch diameter, the foam issues at a temperature of 220° F. and at a rate of about 2 oz. per minute. A pressure of 40-50 psig may be applied to the air intake of the spray unit, whereupon the foam paint composition is atomized and conveyed to a substrate, where it may then be cured by heating to a solid film.

The polyester resin paint composition employed above was 100% solids consisting essentially of adipic and phthalic acids polymerized with propylene glycol and trimethylol propane. To the above paint formula was added in separate experiments, several foaming agents including propane alone, butane alone, and a combination of propane and butane in equal parts by weight. The results of these experiments are demonstrated by FIG. 2 of the drawing. With reference to FIG. 2, the conditions of the pressure pot, percentages of components, and foam-volume ratios are shown. The paint composition in the pressure pot was maintained at approximately 185° F. Samples were dispensed through the dispensing valve in order to determine the foam-volume ratios. As shown in FIG. 2, for each of the examples recorded, the use of propane alone in the polyester paint composition produced foam-volume ratios of approximately 10:1 or less over about a 1% range of propane in the paint. In contrast, the use of butane alone produced a foam-volume ratio of about 11:1 or less over about a 1.5% range (at 10:1). However, equal parts by weight of propane and butane clearly demonstrate that the 50/50 mix produces a greater maximum foam-volume ratio, i.e., nearly 13:1 being reached in one datum at 194.7 psia and 2.3% by weight of the 50/50 mix of butane and propane. Also, a greater range of uniformity of foam-volume ratio was demonstrated. Therefore, for foaming of paint in the examples illustrated, the blowing agent mixture of butane and propane produced a synergistic result as compared with foaming the same paint with either foaming agent used alone. Specifically, the synergistic results are demonstrated as to both maximum foam-volume ratio achieved and as to the range of percent foaming agent by weight that foaming occurs at a ratio of volume about 10/1 for useful foam coating of paint.

Figure 3:
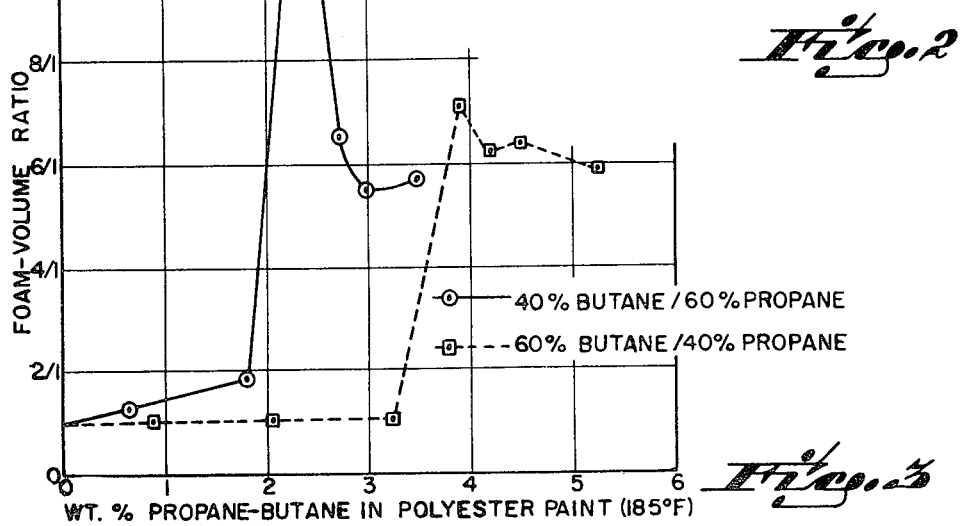
FIG. 3 is a foaming curve for polyester paint containing other ratios of propane and butane blowing agent.

FIG. 3 demonstrates the foam-volume ratios achieved by the employment of a mixture of 40% butane and 60% propane along with a mixture of 60% butane and 40% propane. The paint composition was the same as employed for the data obtained in FIG. 2 under the same conditions except for the variation in the mixtures of propane and butane. As demonstrated by FIG. 3, a very narrow range of foam-volume ratio was obtained for the mixture of 40% butane and 60% propane at approximately 2½% by weight in the paint. All other data indicated foam-volume ratios less than 7:1. Furthermore, for the 60% butane and 40% propane mix, the results were even less favorable, i.e, indicating that less than about 7:1 foam-volume ratios are obtainable with the 60/40 mix. Therefore, by comparison of the results in FIGS. 2 and 3, equal parts by weight of propane and butane in a polyester paint composition provide synergistic results over each of the individual components alone. Furthermore, in the same paint composition where 60/40 and 40/60 mixes of butane and propane are employed, as demonstrated by FIG. 2, the results are not nearly as advantageous. Nor are the results as goods as propane and butane alone. Therefore, unpredictable and unobvious results are achieved by combination of propane and butane at equal parts by weight in polymeric coating systems as demonstrated by FIGS. 2 and 3.

III. Epoxy Paint and Methanol Blowing Agent

The following formulation (percent by weight) is prepared by melting the Epon 1001 resin at about 200° F. containing in admixture Epon 828 in the pressure pot.

72.3% Epon 1001 (Shell Chemical Co.)
4.5% Epon 828 (Shell Chemical Co.)
18.9% Hexamethylmethoxy melamine
3.4% Methanol
0.9% Catalyst The hexamethylmethoxy melamine is added to the resin mixture with agitation at 150°–200° F. The mixture is allowed then to cool to below about 140° F. before the addition of methanol, whereupon the methanol is slowly added under continuous agitation. The catalyst is finally mixed into the resultant resin composition. Prior to the addition of the catalyst and methanol, the viscosity of this clear enamel formula is 2090 centipoises by ASTM D3236 at 200° F. Methanol is also added to the pressure vessel to control the constant foam-volume ratio in a manner similar to procedures of I above. The material may be foamed through the dispensing gun or sprayed through the apparatus mentioned above at a nozzle temperature of 219° F. at about 3 oz./min.

IV. Polyethylene Coating and Isopropanol Blowing Agent

A coating grade polyethylene (Allied Chemical 635) is melted in the pressure pot illustrated in FIG. 1 at 350° F. The viscosity by ASTM D3236 was found to be 2800 cps at 350° F. Isopropanol, approximately 1% by weight, is added to the molten polyethylene. Constant foam-volume ratios are dispensed in a manner similar to the procedures of I above.

V. Ethylene/Vinyl Acetate Coating and Isopropanol Blowing Agent

The following formulation is mixed and melted in the apparatus of FIG. 1 as above.

Ethylene/Vinyl Acetate copolymer (70/30)—1400 grams
Paraffin wax—600 grams
Aerosol OT—20.2 grams
Cab-O-Sil Fuse Silica by Cabot Standard Grade M5—2.02 grams The melted formulation is foamed with isopropanol following the procedures used for polyethylene with similar results of constant foam-volume ratios.

VI. Vinyl Chloride/Vinyl Acetate Coating and Methanol Blowing Agent

The following ingredients were formulated on a percent by weight basis:

12.7% VYLF Union Carbide, resin, i.e., copolymer of vinyl chloride and vinyl acetate in a ratio of 88:12
12.7% Hexamethylmethoxy melamine
47.2% Dioxtyl Phthalate plasticizer
0.3% Thermolite 49 Stabilizer (M & T Chemicals)
0.4% Thermolite 31 Stabilizer (M & T Chemicals)
25.4% $TiO_2$
1.3% Methanol The above vinyl resin, hexamethylmethoxy melamine and $TiO_2$ are mixed together in the vessel of FIG. 1 and agitated at high speed. While under agitation, the stabilizers above mentioned are added near the start of the grind to avoid degradation due to heat. After approximately 30 minutes, the mixture is reduced with the plasticizer and methanol. Whereupon the mixture is again agitated until a thorough blend was achieved. The viscosity by ASTM D3236 is 2090 cps (without methanol) at 200° F. This coating composition formula is processed with the apparatus of FIG. 1 by the introduction into the pot at about 125° F., whereupon the composition is processed in a manner similar to procedures of I above.

VII. Acrylic Resin Coating and Methanol Blowing Agent

An acrylic enamel extended with polyester resin is formulated by combining the following components on a parts basis.

| | |
|---|---|
| Acrylic Resin (DuPont, "Elvacite" EP2028) | 261.9 |
| Acrylic-Polyester Resin Castolite-AF (The Castolite Company) | 1900.7 |
| Hexamethylmethoxy Melamine | 930.1 |
| Titanium Dioxide | 2479.2 |
| Silicone Surfactant | 8.6 |
| Methanol | 108.4 |
| Catalyst | 11.3 |
| | 5700.2 |

The viscosity of this formulation was determined to be 1100 cps at 200° F. by ASTM D3236. The material is placed in the pressure pot of FIG. 1 above and approximately one pound of refrigerant 12 ($CF_2Cl_2$) is added to the paint with venting to remove air from the vessel. The stirrer is operated to mix the liquid refrigerant 12 with the enamel formulation. Constant foam-volume ratios are then achieved in a manner similar to the procedures of I above.

In view of the above detailed description and operating examples, other modifications and embodiments of the practice of this invention may be employed without departing from the scope hereof.

What is claimed is:

1. A method for dispensing a foamable composition having a constant foam-volume ratio comprising containing in a vessel a foamable mixture of polymeric liquid composition and a blowing agent under pressure, said vessel having means defining a vapor space above said liquid composition and a dispensing outlet, holding in a pressure container the blowing agent under pressure, said pressure container having means defining a vapor space, delivering blowing agent from the vapor space of said pressure container to the vapor space of said vessel to maintain a substantially constant composition of said blowing agent in said vapor space of said vessel above said liquid mixture under a vapor pressure at least equal to the vapor pressure of said mixture, and dispensing a foam of constant foam-volume ratio from said foamable mixture.

2. The method of claim 19 wherein said mixture contains a liquid blowing agent.

3. The method of claim 1 conducted under the action of heat and the blowing agent is a liquid which vaporizes to form the foam upon release of pressure.

4. The method of claim 1 wherein the liquid composition is a thermoplastic material and the method is conducted under the action of heat.

5. The method of claim 1 wherein the liquid composition is selected from the group consisting of plastisols and organosols.

6. The method of claim 1 wherein the foam composition is conveyed by atomizing and spraying.

7. The method of claim 1 wherein said liquid composition is a thermosetting composition and the method is conducted under the influence of heat.

8. The method of claim 1 wherein said polymeric composition is selected from the group consisting of a thermoplastic material, a thermosetting material, and liquid dispersions thereof.

9. The method of claim 8 wherein said polymer is selected from the group consisting of polymers of ethylenically unsaturated monomers, polymers of conjugated diene monomers, epoxy polymers, polyesters, polyamides, polyesteramides, and polyurethanes, and copolymers of said monomers.

* * * * *

UNITED STATES PATENT AND TRADEMARK OFFICE
CERTIFICATE OF CORRECTION

PATENT NO. : 4,423,161
DATED : December 27, 1983
INVENTOR(S) : Walter H. Cobbs, Jr. et al It is certified that error appears in the above-identified patent and that said Letters Patent is hereby corrected as shown below:

Col. 2, line 14 "twp" should be --two--

Col. 3, line 18 "handbood" should be --handbook--

Col. 5, line 14 "term" should be --termed--

Col. 5, line 23 "from" should be --foam--

Col. 5, line 35 "incorpoerated" should be --incorporated--

Col. 11, line 24 "claim 19" should be --claim 1--

Signed and Sealed this

Twenty-eighth Day of August 1984

[SEAL]

Attest:

GERALD J. MOSSINGHOFF

Attesting Officer

Commissioner of Patents and Trademarks